C. PECK & R. R. BALL.
Milk-Cooler.

No. 205,295. Patented June 25, 1878.

Witnesses:
Henry L. Bruns
E. T. Bond

Inventors:
Charles Peck
Robert R. Ball
By West & Bond
Attys

UNITED STATES PATENT OFFICE.

CHARLES PECK, OF CHICAGO, ILLINOIS, AND ROBERT R. BALL, OF WEST MERIDEN, CONNECTICUT.

IMPROVEMENT IN MILK-COOLERS.

Specification forming part of Letters Patent No. 205,295, dated June 25, 1878; application filed March 22, 1878.

*To all whom it may concern:*

Be it known that we, CHARLES PECK, of Chicago, in the county of Cook and State of Illinois, and ROBERT R. BALL, of West Meriden, in the county of New Haven and State of Connecticut, have invented certain new and useful Improvements in Devices for Cooling Milk; and we do hereby declare the following to be a full, clear, and exact description thereof, reference being had to the accompanying drawing, and to the letters of reference marked thereon.

The nature of our invention consists in a pan constructed with a central chamber extending from the top end nearly to the bottom, thereby forming a passage, and a shallow pan, all as hereinafter more fully set forth.

Figure 1:
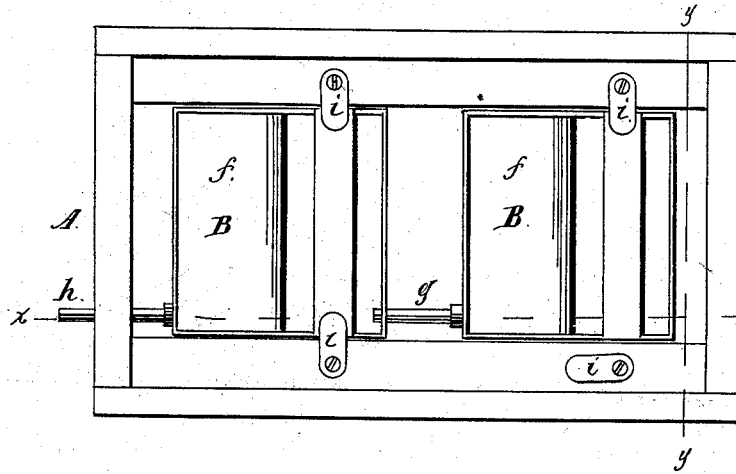
Figure 2:
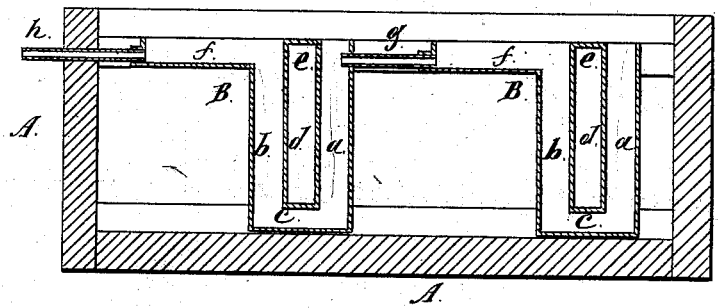
Figure 4:
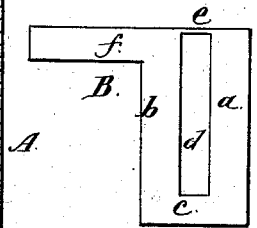
Figure 3:
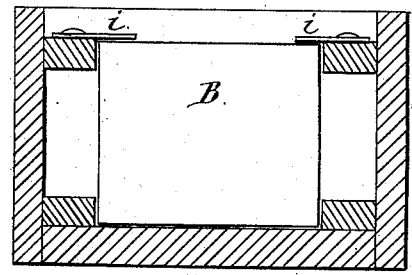

In the annexed drawing, Figure 1 is a plan view, showing two pans arranged in a tank. Fig. 2 is a longitudinal vertical section of the same on the line $x\ x$, Fig. 1. Fig. 3 is a transverse vertical section on the line $y\ y$, Fig. 1. Fig. 4 is a side elevation of a pan.

A represents a tank of any suitable dimensions, to receive one or more pans, and designed to be filled with cold water or have a current of water passing through it.

B represents the milk-pan, constructed with a central chamber, $d$, extending from the top nearly to the bottom, and covered at the top by a plate, $e$, which strengthens and braces the two parts of the pan. The chamber $d$ divides the pan into two deep parts, $a$ and $b$, which are connected by a passage, $c$, below the chamber $d$. On one side the pan B is extended at the top to form a shallow part, $f$; but it is evident that, if desired, a similar shallow part may be formed on the opposite side.

Where two or more pans B are used in the same tank A, said pans are connected at the top by tubes $g$, as shown, and the last pan has a discharge-pipe, $h$, extending from its shallow part $f$.

The pans B should be so fixed in the tank that they can be easily removed therefrom to be cleansed, and they are held in place in the tank by buttons $i$, or other suitable fastenings.

The milk to be cooled is poured into the part $a$ of the first pan B, from which it passes through the passage $c$ into the part $b$, and from thence into the shallow part $f$. When more than one pan is used the milk then flows through the tube $g$ into the part $a$ of the next pan, and so on until discharged from the last pan into a suitable receptacle.

The milk in the parts $a$ and $b$ of the pan B will be emptied after removing the pan from the tank.

The milk flowing through the deep and narrow parts $a\ b$, which are surrounded by cold water, will be rapidly cooled, and while passing over the shallow part $f$ will be not only further cooled, but will also be sufficiently deodorized, considerable surface being presented to the air while flowing over said shallow part $f$.

We are aware that a shallow evaporating-pan constructed with a deep boiler, and the boiler divided into cells by means of tubes which form flame-flues, is not new, and we do not therefore broadly claim such as our invention; but,

Having thus fully described our invention, what we claim as new, and desire to secure by Letters Patent, is—

In a milk-cooler, the pan B, having a central chamber extending from the top and nearly to the bottom, thereby forming a passage, $c$, and the shallow pan $f$, substantially as and for the purposes herein set forth.

CHARLES PECK.
ROBERT R. BALL.

Witnesses to Peck:
  O. W. BOND,
  F. F. BRUNS.

Witnesses to Ball:
  JACOB A. SCHANDEIN,
  A. OLWINE UMSTED.